United States Patent [19]

Scheckenbach

[11] Patent Number: 6,046,285

[45] Date of Patent: *Apr. 4, 2000

[54] POLYMER BLENDS CONTAINING SULFOXIDE GROUPS

[75] Inventor: Helmut Scheckenbach, Langen, Germany

[73] Assignee: Hoechst Aktiengesellschaft, Germany

[ * ] Notice: This patent is subject to a terminal disclaimer.

[21] Appl. No.: 08/923,028

[22] Filed: Sep. 3, 1997

[30] Foreign Application Priority Data

Sep. 5, 1996 [DE] Germany .............................. 196 36 001

[51] Int. Cl.[7] .............................. C08L 81/00; C08L 59/00; C08L 67/00; C08L 79/08

[52] U.S. Cl. ........................... 525/537; 525/189; 525/398; 525/400; 525/418; 525/420; 525/437; 525/471; 525/472; 525/535; 525/540

[58] Field of Search ..................................... 525/537, 189, 525/535, 540, 418, 420, 398, 400, 437, 471, 472; 528/388

[56] References Cited

U.S. PATENT DOCUMENTS

| | | | |
|---|---|---|---|
| 5,708,041 | 1/1998 | Scheckenbach et al. | 521/77 |
| 5,721,282 | 2/1998 | Schonfeld | 521/51 |
| 5,780,561 | 7/1998 | Scheckenbach et al. | 525/534 |
| 5,786,397 | 7/1998 | Scheckenbach et al. | 521/77 |
| 5,948,430 | 9/1999 | Scheckenbach et al. | 521/77 |

*Primary Examiner*—Mark L. Warzel
*Attorney, Agent, or Firm*—Connolly Bove Lodge & Hutz

[57] ABSTRACT

Polymer blends obtainable by thermal treatment, at not less than 150° C., of a mixture containing at least one high-performance polymer and from 15 to 99 parts by weight or preferably from 40 to 90 parts by weight and particularly preferably from 55 to 75 parts by weight, of a polymer containing sulfoxide groups, and crosslinked or partly crosslinked polymer blend obtainable by thermal treatment, at not less than 150° C., of a mixture containing at least one of the high-performance polymers polyesters, partly fluorinated polymers, polyethersulfones, polysulfones, polyetherimides, polyamidoimides or polyacetals and at least one polymer containing sulfoxide groups, are distinguished by high thermal and chemical stability. Polymers containing sulfoxide groups are polyarylene sulfoxides, in particular polyphenylene sulfoxide. The polymer blends are used for the production of fibers, films or shaped articles.

18 Claims, No Drawings

POLYMER BLENDS CONTAINING SULFOXIDE GROUPS

The invention relates to polymer blends which contain polymers containing sulfoxide groups and high-performance polymers, and a process for their preparation.

Crosslinked molding materials comprising polyarylene sulfides and polyarylene sulfoxides are described in EP-A2-718368. Thermosetting polymer blends are not mentioned.

WO 96/05252 describes blends of liquid crystalline polymers (LCP) or polyesteramides and polyarylene sulfoxides.

EP-A2-0710707 describes foamed fluorine polymers containing from 1 to 50% by weight of polyarylene sulfoxide. Crosslinking is not described.

Surprisingly, it was found that only certain high-performance polymers, such as polyesters, partly fluorinated polymers, polyethersulfones, polysulfones, polyetherimides, polyamidoimides and polyacetals, form crosslinks with polymers containing sulfoxide groups on thermal treatment.

It was also found, that, on thermal treatment of uncrosslinkable high-performance polymers, the polymer containing sulfoxide groups forms crosslinked islands or, above a content of about 15 parts by weight of a polymer containing sulfoxide groups, forms a crosslinked matrix (interpenetrating network) in the polymer blend.

The invention thus relates to polymer blends obtainable by thermal treatment, at not less than 150° C., of a mixture containing from 1 to 85 percent by weight of at least one high-performance polymer and from 15 to 99 percent by weight of a polymer containing sulfoxide groups, the percentages by weight being based on the total polymer content of the polymer blend. The polymer blends preferably contain from 40 to 90 percent by weight of polymer containing sulfoxide groups and from 10 to 60 percent by weight of a high-performance polymer, particularly preferably from 55 to 75 percent by weight of a polymer containing sulfoxide groups and from 25 to 45 percent by weight of a high-performance polymer.

The invention furthermore relates to crosslinked or partly crosslinked polymer blends, obtainable by thermal treatment, at not less than 150° C., of a mixture containing at least one of the high-performance polymers polyesters, partly fluorinated polymers, polyethersulfones, polysulfones, polyetherimides, polyamidoimides or polyacetals and at least one polymer containing sulfoxide groups. The crosslinked or partly crosslinked polymer blends contain from 1 to 99 percent by weight of polymer containing sulfoxide groups and from 1 to 99 percent by weight of high-performance polymer, the percentages by weight being based on the total polymer content of the polymer blend and summing to 100 percent by weight. Polymer blends preferably contain from 1 to 70 percent by weight of polymer containing sulfoxide groups and from 30 to 99 percent by weight of high-performance polymer and particularly preferably from 1 to 50 percent by weight of polymer containing sulfoxide groups and from 50 to 99 percent by weight of high-performance polymer.

The invention furthermore relates to a process for the preparation of polymer blends, a mixture of at least one high-performance polymer and at least one polymer containing sulfoxide groups, preferably polyarylene sulfoxide and particularly preferably polyphenylene sulfoxide, being heated to temperatures in the range from 150 to 400° C., preferably to a temperature in the range from 280° C. to 380° C.

Polymer containing sulfoxide groups is understood as meaning polymers or oligomers which contain at least one arylene sulfoxide unit (—Ar—SO—; A=arylene). The arylenes are based, for example, on monocyclic or polycyclic aromatics which may be monosubstituted or polysubstituted. Examples are phenylene, biphenylene or (—$C_6H_4$—$C_6H_4$—), naphthalene, anthracene or phenanthrene. Substituents are, for example, straight-chain, cyclic or branched $C_1$–$C_{20}$-hydrocarbon radicals, such as $C_1$–$C_{10}$-alkyl radicals, e.g. methyl, ethyl, n-propyl, iso-propyl, n-butyl, tert-butyl, n-hexyl or $C_6$–$C_{14}$-aryl radicals, e.g. phenyl or naphthyl, halogens or sulfonic acid, amino, nitro, cyano, hydroxyl, alkyloxy or carboxyl groups.

Preferred polymers containing sulfoxide groups are polyarylene sulfide sulfoxides and polyarylene sulfoxides, in particular polyphenylene sulfide sulfoxide and polyphenylene sulfoxide, which can be readily prepared, for example, by partial or complete oxidation of the sulfur groups of polyarylene sulfides with ozone, nitric acid or $NO_2/N_2O_4$. As a rule, polyphenylene sulfoxides having a sulfoxide content (based on all sulfur-containing bridges in the polymer) of at least 10% are used. Depending on the desired property profile of the polymer blends, a higher sulfoxide group content is used. The polymer containing sulfoxide groups which is used has a sulfoxide group content, based on all sulfur atoms present, of at least 10%, preferably at least 40%, particularly preferably at least 65% and very particularly preferably at least 95%. Polyarylene sulfide sulfoxides are also understood below as meaning polyarylene sulfoxides and are included under the definition polyarylene sulfoxides. The polyarylene sulfoxides may also contain sulfonyl groups. The preparation of the polymers containing sulfoxide groups is described, for example, in German Patent Applications DE 4314735, DE 4314736, DE 4440010 and DE 19531163, which are hereby incorporated by reference.

The polymers containing sulfoxide groups, such as polyarylene sulfoxide, in particular polyphenylene sulfoxide, change on thermal treatment at above about 150° C. The change is clearly detectable above a temperature of about 280° C. On the basis of present knowledge, in general sulfur dioxide ($SO_2$) is eliminated and chemical reactions, such as crosslinking occur.

High-performance polymers are understood as meaning plastics which have a melting point of above 100° C. in particular above 200° C. These are described, for example, in Ullmann's Encyclopedia of Industrial Chemistry, 5th Edition, VCH Verlagsgesellschaft mbH, Weinheim-New York 1992: organische Fluorpolymere [Organic fluorine polymers], Volume A11, pages 393–430; Polyamide, [Polyamides] Volume A21, pages 179–206; Polycarbonate [Polycarbonates], Volume A21, pages 207–216; Polyester [Polyesters], Volume A21, pages 227–252, Polyimide [Polyimides], Volume A21, pages 253–273; Polymerblends [Polymer blends], Volume A21, pages 274–305; Hochtemperaturbeständige Polymere [Polymers stable to high temperatures], Volume A21, pages 449–472; Polymethylmethacrylate [Polymethyl methacrylates], Volume A21, pages 473–486; Polyphenylenoxide [Polyphenylene oxides], Volume A21, pages 605–614; Polyurethane [Polyurethanes], Volume A21, pages 665–716 and Silikone [Silicones], Volume A24, pages 57–95; Polyoxymethylene [Polyoxymethylenes], Volume A21, pages 591–603, each of which is hereby incorporated by reference.

High-performance polymers are also described, for example, in "G. W. Becker, D. Braun: Kunststoff-Handbuch [Plastics Manual] Vol. 3/3, Carl Hanser Verlag, Munich 1994", which is hereby incorporated by reference (Polyacrylate [Polyacrylates]: pages 1–53; Polysulfone

[Polysulfones]: pages 141–217; Flüssigkristalline Polyester [Liquid Crystalline Polyesters]: pages 219–258; Polyimide [Polyimides]: pages 263–293; Polyetherimide [Polyetherimides]: pages 297–335; Polyamidimide [Polyamidoimides]: pages 337–356; Poly(aryletherketone) [Poly(aryletherketones)]: pages 359–385).

Polysulfones are also described in "Encyclopedia of polymer science and engineering, Volume 13, Wiley, New York 1988, pages 196–211, keyword 'Polysulfones'", which is hereby incorporated by reference.

The high-performance polymers cycloolefin copolymer (COC) are described in "H. Cherdron, M. Brekner and F. Osan, Die Angewandte Makromolekulare Chemie [Applied Macromolecular Chemistry] (223), 121, (1994)", which is hereby incorporated by reference.

Particularly preferred high-performance polymers are polyesters, partly fluorinated polymers, polyethersulfones, polysulfones, polyetherimides, polyamidoimides or polyacetals. Partly fluorinated polymers are thermoplastic fluorine polymers which contain crosslinkable groups, such as hydrogen-carbon bonds (H—C), chlorine-carbon bonds (Cl—C), bromine-carbon bonds (Br—C), iodine carbon bonds (I—C), unsaturated bonds (e.g. C—C-double bonds, aromatic structures). PFA (perfluoroalkoxy) is regarded as a completely fluorinated polymer since only fluorine-carbon moieties linked via an ether bridge are present. Partly fluorinated polymers are, for example, ETFE (tetrafluoroethylene/ethylene copolymer) and THV (terpolymer of tetrafluoroethylene, hexafluoropropylene and vinylidene fluoride).

The polymer blend which contains at least one high-performance polymer and at least one polymer containing sulfoxide groups does not lead to crosslinking in the case of each high-performance polymer. It is not possible to predict which high-performance polymers can be crosslinked by means of a polymer containing sulfoxide groups and this must be determined experimentally in each case. The crosslinking of the high-performance polymers leads to an increase in the melt viscosity. Crosslinked polymer blends are formed, for example, by polyesters, partly fluorinated polymers, polyethersulfones, polysulfones, polyetherimides or polyamidoimides. On the basis of present knowledge, no crosslinking occurs in polymer blends with PFA (perfluoroalkoxy) or polyarylene ether ketones. However, regardless of the crosslinkability of the high-performance polymers, the polyarylene sulfoxide can form an interpenetrating network of crosslinked polyarylene sulfide in the polymer blend when the polymer blend contains more than 15% by weight (based on the total polymer content of the polymer blend) of polyarylene sulfoxide (sulfoxide content, for example, more than 95%), percentages by weight in the range from 40 to 90%, in particular from 55 to 75%, being preferred, or can form islands of crosslinked polyarylene sulfide in the polymer blend when the amounts by weight of polyarylene sulfoxide are lower (for example less than 15% by weight).

Polymer blends with an amount by weight, used in the preparation, of more than 40 percent by weight of polymer containing sulfoxide groups behave like thermosetting plastics. Above about 55 percent by weight of polymer containing sulfoxide groups, a degree of crosslinking which is advantageous for applications for parts subjected to thermal and chemical stress is achieved.

The degree of crosslinking in the polymer blend depends on various parameters, such as the type of polymer containing sulfoxide groups, in particular the amount of sulfoxide groups and the content of the polymer containing sulfoxide groups in the polymer blend. In addition, the degree of crosslinking depends on the melt viscosity of the high-performance polymer and on the processing temperature. The degree of crosslinking is thus controllable and may be varied as desired.

According to the invention, mixtures or blends of different high-performance polymers may also be used as the high-performance polymer and mixtures of different polymers containing sulfoxide groups may also be used as the polymer containing sulfoxide groups.

The polymer blends according to the invention may contain conventional additives, such as heat stabilizers, UV stabilizers, antistatic agents, flameproofing agents, dyes, pigments, inorganic and/or organic fillers (powders, fibers, etc.) or lubricant additives, such as molybdenum disulfide, graphite or polytetrafluoroethylene.

For the preparation of the polymer blend, the polymer containing sulfoxide groups should be as finely and uniformly distributed as possible in the mixture. This is achieved, for example, by using fine powders. In general, the mean particle sizes of the powder are in the range from about 0.3 to 500 $\mu$m, preferably from 5 to 300 $\mu$m, particularly preferably from 5 to 100 $\mu$m. It is also possible to achieve good mixing by thermal processing, for example by means of commercial kneaders or extruders, preferably twin-screw extruders, at temperatures at which the high-performance polymer melts.

The average molecular weight of the polymers containing sulfoxide groups, expressed as the weight average $M_w$ (determined by GPC), is in general from 4000 to 200,000 g/mol, preferably from 10,000 to 150,000 g/mol, particularly preferably from 25,000 to 100,000 g/mol.

The polymer blends according to the invention are prepared in general from the initial components in mixers suitable for this purpose.

In the process according to the invention, the polymer blend is processed by known methods (e.g. injection molding, hot pressing, extrusion, blow molding) in apparatuses suitable for this purpose, at temperatures of from 150° C. to 400° C., preferably from 280 to 380° C., to give moldings or shaped articles, crosslinking taking place.

In the thermal treatment, polymer blends according to the invention can lead to a bubble-containing or foamed product. In order to obtain a bubble-free product, it is possible, for example, to adopt the following methods:

a) High-performance polymer and polymer containing sulfoxide groups are melted together in the extruder at temperatures above 150° C., advantageously from about 300 to 360° C. (with the use of polyphenylene sulfoxide having a sulfoxide group content of about 100%). The product formed here generally contains bubbles or is foamed, depending on the sulfoxide content. Bubbles are eliminated by further thermal treatment.

b) High-performance polymer and polymer containing sulfoxide groups can also be melted together in the extruder at temperatures below about 300° C. (with the use of polyphenylene sulfoxide having a sulfoxide group content of about 100%) without foam formation or bubble formation, the degree of crosslinking achieved being lower than in the case of a thermal treatment at above 300° C.

Thermoplastically processable polymer blends with crosslinkable high-performance polymers have a higher melt viscosity than the pure high-performance polymers. An increase in the value of the melt viscosity is desired, for example, in the case of high-performance polymers having too low a molar mass, in order to improve the thermoplastic processability. With an increase in the crosslinking, the chemical resistance of the polymer blend increases. The thermoplastic polymer blends are therefore used for the production of shaped articles, such as fibers, films and moldings. The crosslinked polymer blend has a higher ratio of storage modulus to loss modulus compared with the pure high-performance polymer. For example, the ratio for the polymer blend is 10% greater than the value for the high-performance polymer.

Owing to the high degree of crosslinking, thermosetting polymer blends are suitable in particular for use for the production of shaped articles having high solvent resistance. Moreover, the thermosetting polymer blends are used for the production of shaped articles having high dimensional stability when subjected to thermal stress. Moldings having great hardness and rigidity can be produced from thermosetting polymer blends.

EXAMPLES

In Examples 2 to 8, polyphenylene sulfoxide (PPSO) prepared according to Example 1 is used.

1. Preparation of Polyphenylene Sulfoxide (PPSO)

1250 ml of 86% strength nitric acid are initially introduced at room temperature into a four-necked flask with a stirrer. 200 g of polyphenylene sulfide (Fortron 0205 B4/20 µm, Hoechst AG, Frankfurt am Main, Germany) are then added over a period of 40 min, the polyphenylene sulfide going into solution. As a result of the heat of reaction, the temperature of the reaction mixture increases to about 40° C. and is kept at this temperature by means of external cooling. After the end of the addition of polyphenylene sulfide, stirring is continued for a further 90 min at 40° C. To precipitate the product, the solution is mixed with 6 l of demineralized water with continuous stirring. The product is filtered off, dried and milled (average particle size $d_{50}$ value: about 20 µm). ESCA-analysis of the product shows that about 98% of the sulfur groups of the polyphenylene sulfide used have been converted into sulfoxide groups (polyphenylene sulfoxide with a sulfoxide content of about 98%). The density of the polyphenylene sulfoxide (PPSO) is about 1.40 g/cm$^3$.

2. Polyester

The polyester used was a polybutylene terephthalate PBT having an MVI (250/2) of 34 cm$^3$/10 min.

PBT was mixed with 0, 10 and 20% by weight of PPSO in a kneader (Rheocord System 40, Haake Buchler, Saddle Brook, N.J., USA) for 10 minutes under an inert gas atmosphere. The kneading temperature was 280° C. The viscosity, the storage modulus and the loss modulus of the blends and the unkneaded pure PBT were then measured by means of time-sweep (60 minutes at ω=10 rad/s) and frequency-sweep (from ω=10$^{-1}$ to 10$^3$ rad/s). The viscosity measurements were carried out at 280° C.

The viscosity measurements showed an increase in the viscosity with increasing PPSO contents in comparison with the kneaded PBT without PPSO addition. The storage modulus increased relative to the loss modulus with increasing PPSO content. This indicates a crosslinking reaction of PBT with PPSO.

| Frequency-sweep | Viscosity [Pa*s] at 10 rad/s | Storage modulus (SM) [Pa] at 10 rad/s | Loss modulus (LM) [Pa] at 10 rad/s | SM/LM |
|---|---|---|---|---|
| 100% PBT | 13.1 | 1.02 | 131 | 0.008 |
| 90% PBT 10% PPSO | 35.8 | 10.7 | 358 | 0.03 |
| 80% PBT 20% PPSO | 54.4 | 319 | 441 | 0.7 |

% data are percent by weight

The weight loss (determined by means of isothermal TGA over 12 h in air at 320° C.) of the blend with 20% by weight of PPSO decreased from 21.1% to 16.8% compared with that with 0% of PPSO.

The modulus of torsion (determined by means of RDA2, from Rheometric Scientific, Bensheim, Germany, measuring range –50° C. to 200° C., measuring atmosphere: air) of the blend with 20% by weight of PPSO was higher than that of pure PBT over the entire measuring range.

3. Fluorine Polymer a) Perfluoroalkoxy (PFA)

The PFA used was Hostaflon PFA 6515 N from Hoechst AG, Frankfurt am Main, Germany. Product properties are documented in the data sheet "Hostaflon" of Hoechst AG.

PFA was mixed with 0, 10 and 20% by weight of PPSO in a kneader (Rheocord System 40, Haake Buchier, Saddle Brook, N.J., USA) for 10 minutes under an inert gas atmosphere. The kneading temperature was 320° C. The viscosity, the storage modulus and the loss modulus of the blends and the unkneaded pure PFA were then measured by means of time-sweep (60 minutes at ω=10 rad/s) and frequency-sweep (from ω=10$^{-1}$ to 10$^3$ rad/s). The viscosity measurements were carried out at 320° C.

The viscosity measurements showed a decrease in the viscosity up to 10% by weight of PPSO added. At 20% by weight of PPSO, the viscosity increased slightly again but did not reach the viscosity of the pure PFA. The storage modulus scarcely changed relative to the loss modulus. There are therefore no crosslinking reactions of PFA with PPSO. Especially at high PPSO contents, however, crosslinking can occur between individual PPSO molecules, which then form an (interpenetrating) network of crosslinked PPS.

| Frequency-sweep | Viscosity [Pa*s] at 10 rad/s | Storage modulus (SM) [Pa] at 10 rad/s | Loss modulus (LM) [Pa] at 10 rad/s | SM/LM |
|---|---|---|---|---|
| 100% PFA | 3640 | 10800 | 34800 | 0.31 |
| 90% PFA 10% PPSO | 1570 | 4280 | 15100 | 0.28 |
| 80% PFA 20% PPSO | 2670 | 8400 | 25400 | 0.33 |

% data are percent by weight

The weight loss (determined by means of isothermal TGA over 12 h in air at 320° C.) of the blend with 20% by weight of PPSO increased from 0.8% to 4.4% compared with that with 0% of PPSO.

The modulus of torsion (determined by means of RDA2, from Rheometric Scientific, Bensheim, Germany, measuring range –150° C. to 300° C., measuring atmosphere: air) of the blend with 20% by weight of PPSO was higher than that of pure PFA at below 130° C. (Tg of PFA) and lower than that of pure PFA at above 130° C. The Tg of the blend with 20% by weight of PPSO at about 130° C. was more pronounced and extended over a broader temperature range than the pure PFA. This indicates reduced crystallinity of the blend with 20% by weight of PPSO.

b) Terpolymer of tetrafluoroethylene, hexafluoropropylene and vinylidene fluoride (THV)

The THV used was the product THV 200 P from 3M, Neuss, Germany. Product properties are documented in the data sheet "THV Fluorthermoplast" [THV fluorine thermoplastic] from 3M.

THV was mixed with 0, 10 and 20% by weight of PPSO in a kneader (Rheocord System 40, Haake Buchier, Saddle Brook, N.J., USA) for 20 minutes at 320° C. under an inert gas atmosphere. The viscosity, the storage modulus and the loss modulus of the blends and the unkneaded pure THV were then measured by means of time-sweep (60 minutes at $\omega=10$ rad/s) and frequency-sweep ($\omega=10^{-1}$ to $10^3$ rad/s). The viscosity measurements were carried out at 280° C.

The viscosity measurements showed an increase in viscosity with increasing PPSO contents compared with the kneaded THV without added PPSO. The storage modulus increased relative to the loss modulus with increasing PPSO content. This indicates a crosslinking reaction of THV with PPSO.

| Frequency-sweep | Viscosity [Pa*s] at 10 rad/s | Storage modulus (SM) [Pa] at 10 rad/s | Loss modulus (LM) [Pa] at 10 rad/s | SM/LM |
|---|---|---|---|---|
| 100% THV | 1160 | 2030 | 11400 | 0.18 |
| 90% THV 10% PPSO | 1850 | 3880 | 18100 | 0.21 |
| 80% THV 20% PPSO | 3110 | 8140 | 30000 | 0.27 |

% data are percent by weight

The weight loss (determined by means of isothermal TGA over 12 h in air at 300° C.) of the blend with 20% by weight of PPSO decreased from 20.6% to 0.9% compared with that with 0% of PPSO.

The modulus of torsion (determined by means of RDA2, Rheometric Scientific, Bensheim, Germany, measuring range −150° C. to 120° C., measuring atmosphere: air) of the blend with 20% by weight of PPSO was higher than that of the pure THV over the entire measuring range.

c) Tetrafluoroethylene/ethylene copolymer (ETFE)

The ETFE used was Hostaflon ET 6210J from Hoechst AG, Frankfurt am Main, Germany. Product properties are documented in the data sheet "Hostaflon" of Hoechst AG.

ETFE was mixed with 0, 10 and 20 % by weight of PPSO in a kneader (Rheocord System 40, Haake Buchler, Saddle Brook, N.J., USA) for 20 min at 320° C. under an inert gas atmosphere. The viscosity, the storage modulus and the loss modulus of the blends and the unkneaded pure ETFE were then measured by means of time-sweep (60 minutes at $\omega=10$ rad/s) and frequency-sweep (from $\omega=10^{-1}$ to $10^3$ rad/s). The viscosity measurements were carried out at 320° C.

The viscosity measurements showed an increase in viscosity with increasing PPSO contents compared with the kneaded ETFE without added PPSO. The storage modulus increased relative to the loss modulus with increasing PPSO content. This indicates a crosslinking reaction of ETFE with PPSO.

| Frequency-sweep | Viscosity [Pa*s] at 10 rad/s | Storage modulus (SM) [Pa] at 10 rad/s | Loss modulus (LM) [Pa] at 10 rad/s | SM/LM |
|---|---|---|---|---|
| 100% ETFE | 676 | 1910 | 6490 | 0.29 |
| 90% ETFE 10% PPSO | 1170 | 3910 | 11000 | 0.36 |
| 80% ETFE 20% PPSO | 1650 | 6070 | 15400 | 0.39 |

% data are percent by weight

The weight loss (determined by means of isothermal TGA over 12 h in air at 320° C.) of the blend with 20% by weight of PPSO decreased from 52.4% to 2.5% compared with that with 0% of PPSO.

The modulus of torsion (determined by means of RDA2, Rheometric Scientific, Bensheim, Germany, measuring range −50° C. to 200° C., measuring atmosphere: air) of the blend with 20% by weight of PPSO was higher than that of the pure ETFE over the entire measuring range.

4. Polyethersulfone (PES)

The PES used was Radel A-200 from Amoco, Düsseldorf, Germany. Product properties are documented in the data sheet "Amoco Performance Products" of Amoco.

PES was mixed with 0, 10 and 20% by weight of PPSO in a kneader (Rheocord System 40, Haake Buchier, Saddle Brook, N.J., USA) for 20 min at 360° C. under an inert gas atmosphere. The viscosity, the storage modulus and the loss modulus of the blends and the unkneaded pure PES were then measured by means of time-sweep (60 minuten at $\omega=10$ rad/s) and frequency-sweep (from $\omega=10^{-1}$ to $10^3$ rad/s). The viscosity measurements were carried out at 360° C.

The viscosity measurements showed an increase in the viscosity with increasing PPSO contents compared with the kneaded PES without added PPSO. The storage modulus increased relative to the loss modulus with increasing PPSO content. This indicates a crosslinking reaction of PES with PPSO.

| Frequency-sweep | Viscosity [Pa*s] at 10 rad/s | Storage modulus (SM) [Pa] at 10 rad/s | Loss modulus (LM) [Pa] at 10 rad/s | SM/LM |
|---|---|---|---|---|
| 100% PES | 1520 | 3620 | 14800 | 0.24 |
| 90% PES 10% PPSO | 2190 | 8520 | 20100 | 0.42 |
| 80% PES 20% PPSO | 3740 | 22800 | 29600 | 0.77 |

% data are percent by weight

The weight loss (determined by means of isothermal TGA over 12 h in air at 360° C.) of the blend with 20% by weight of PPSO increased from 2.2% to 4.0% compared with that with 0% of PPSO.

The modulus of torsion (determined by means of RDA2, Rheometric Scientific, Bensheim, Germany, measuring range −50° C. to 250° C., measuring atmosphere: air) of the blend with 20% by weight of PPSO was comparable with that of the pure PES of up to about 200° C. However the Tg of the blend with 20% by weight of PPSO was about 10% lower. This indicates (partial) miscibility.

5. Polyaryl Ether Ketone (PAEK)

The PAEK used was PEEK 450G from Victrex GmbH, Hofheim, Germany. Product properties are documented in the data sheet "Victrex PEEK" of ICI Materials, Middlesbrough, UK.

PAEK was mixed with 0, 10 and 20% by weight of PPSO in a kneader (Rheocord System 40, Haake Buchler, Saddle Brook, N.J., USA) for 20 min at 360° C. under an inert gas atmosphere. The viscosity, the storage modulus and the loss modulus of the blends and the unkneaded pure PAEK were then determined by means of time-sweep (60 minutes at $\omega=10$ rad/s) and frequency-sweep (from $\omega=10^{-1}$ to $10^3$ rad/s). The viscosity measurements were carried out at 360° C.

The viscosity measurements showed a decrease in the viscosity with increasing PPSO contents compared with the kneaded PAEK without added PPSO. The storage modulus decreased relative to the loss modulus with increasing PPSO content. There are therefore no crosslinking reactions of PAEK with PPSO. Especially at high PPSO contents, however, crosslinking may occur between the individual PPSO molecules, which then form an (interpenetrating) network of crosslinked PPS.

| Frequency-sweep | Viscosity [Pa*s] at 10 rad/s | Storage modulus (SM) [Pa] at 10 rad/s | Loss modulus (LM) [Pa] at 10 rad/s | SM/LM |
| --- | --- | --- | --- | --- |
| 100% PAEK | 3890 | 24200 | 30400 | 0.80 |
| 90% PAEK 10% PPSO | 1010 | 4270 | 9190 | 0.46 |
| 80% PAEK 20% PPSO | 537 | 1710 | 5090 | 0.34 |

% data are percent by weight

The weight loss (determined by means of isothermal TGA over 12 h in air at 360° C.) of the blend with 20% by weight of PPSO increased from 1.4% to 4.8% compared with that with 0% of PPSO.

The modulus of torsion (determined by means of RDA2, Rheometric Scientific, Bensheim, Germany, measuring range, −50° C. to 350° C., measuring atmosphere: air) of the blend with 20% by weight of PPSO was comparable with that of pure PAEK at below the Tg (about 160° C.). However, the Tg of the blend with 20% by weight of PPSO extended over a longer temperature range than that of the pure PAEK. At temperatures above the Tg, the modulus of torsion of the blend with 20% by weight of PPSO was higher than that of the pure PAEK.

6. Polyetherimide (PEI)

The PEI used was Ultem 1010 from General Electric Plastics, Rüsselsheim, Germany. Product properties are documented in the data sheet "Ultem" of General Electric Plastics.

PEI was mixed with 0 and 20% by weight of PPSO in a kneader (Rheocord System 40, Haake Buchler, Saddle Brook, N.J., USA) for 20 min at 360° C. under an inert gas atmosphere.

Both products were then transferred to test tubes and slowly heated by means of a heating block and their change of state was observed.

| Temperature | 100% PEI | 80% PEI 20% PPSO |
| --- | --- | --- |
| 260° C. | soft-resilient | soft-resilient |
| 275° C. | soft-resilient | soft-resilient |
| 300° C. | melt | soft-resilient |
| 400° C. | melt | soft-resilient |
| 410° C. | melt | soft-resilient |
| 460° C. | melt | soft-resilient |

% data are percent by weight

Since the mixture with 20% by weight of PPSO does not melt, this indicates a crosslinking reaction of PEI with PPSO.

In addition, the DSC measurements were carried out for both products (measuring range: from 30° C. to 380° C., heating rate: 20K/min, atmosphere: nitrogen). Here, the blend with 20% by weight of PPSO had a Tg about 20° C. lower. This indicates (partial) miscibility of PEI and PPSO.

The weight loss (determined by means of isothermal TGA over 12 h in air at 360° C.) of the blend with 20% by weight of PPSO increased from 1.3% to 5.2% compared with that with 0% of PPSO.

7. Polysulfone (PSU)

The PSU used was Ultrason S2010 from BASF AG, Ludwigshafen, Germany. Product properties are documented in the data sheet "Ultrason S/E" of BASF.

PSU was mixed with 0 and 20% by weight of PPSO in a kneader (Rheocord System 40, Haake Buchler, Saddle Brook, N.J., USA) for 20 min at 360° C. under an inert gas atmosphere.

Both products were then transferred to test tubes and slowly heated by means of a heating block and their change of state was observed.

| Temperature | 100% PSU | 80% PSU 20% PPSO |
| --- | --- | --- |
| 260° C. | melt | soft-resilient |
| 275° C. | melt | soft-resilient |
| 300° C. | melt | soft-resilient |
| 400° C. | melt | firm-resilient |
| 410° C. | melt | firm-resilient |
| 460° C. | melt | firm-resilient |

% data are percent by weight

Since the blend with 20% by weight of PPSO did not melt, this indicates a crosslinking reaction of PSU with PPSO.

In addition, DSC measurements were carried out for both products (measuring range: from 30° C. to 380° C., heating rate: 20K/min, atmosphere: nitrogen). Here, the blend with 20% by weight of PPSO had a Tg about 25° C. lower. This indicates (partial) miscibility of PSU and PPSO.

The weight loss (determined by means of isothermal TGA over 12 h in air at 360° C.) of the blend with 20% by weight of PPSO increased from 3.8% to 7.8% compared with that with 0% of PPSO.

8. Polyamidoimide (PAI)

The PAI used was Torlon 4203L from Amoco, Dusseldorf, Germany. Product properties are documented in the data sheet "Amoco Performance Products" of Amoco.

PAI was mixed with 0 and 20% by weight of PPSO in a kneader (Rheocord System 40, Haake Buchler, Saddle Brook, N.J., USA) for 5 min at 340° C. under an inert gas atmosphere. Both products were then transferred to test tubes and slowly heated by means of a heating block and their change of state was observed.

| Temperature | 100% PAI | 80% PAI 20% PPSO |
| --- | --- | --- |
| 260° C. | soft-resilient | hard-resilient |
| 275° C. | soft-resilient | hard-resilient |
| 300° C. | soft-resilient | hard |
| 400° C. | hard-resilient | hard |
| 410° C. | hard-resilient | hard |
| 460° C. | hard-resilient | hard |

% data are percent by weight

Since the blend with 20% by weight of PPSO exhibits lower deformability, this indicates a crosslinking reaction of PAI with PPSO.

The weight loss (determined by means of isothermal TGA over 12 h in air at 340° C.) of the blend with 20% by weight of PPSO increased from 3.2% to 3.6% compared with that with 0% of PPSO.

What is claimed is:

1. A polymer blend obtained by thermal treatment, at not less than 150° C., of a mixture containing from 1 to 85 percent by weight of at least one high-performance polymer selected from the group consisting of polyesters, polyethersulfones, polysulfones, polyetherimides, polyamidoimides and polyacetals and from 15 to 99 percent by weight of a polymer containing sulfoxide groups, the percentages by weight being based on the total polymer content of the polymer blend and summing to 100% by weight.

2. A crosslinked or partly crosslinked polymer blend obtained by thermal treatment, at not less than 150° C., of a mixture containing at least one high-performance polymer selected from the group consisting of polyesters, polyethersulfones, polysulfones, polyetherimides, polyamidoimides and polyacetals, and at least one polymer containing sulfoxide groups.

3. The polymer blend as claimed in claim 1, containing from 10 to 60% by weight of at least one high-performance polymer and from 40 to 90% by weight of a polymer containing sulfoxide groups.

4. The polymer blend as claimed in claim 1, containing from 25 to 45% by weight of at least one high-performance polymer and from 55 to 75% by weight of a polymer containing sulfoxide groups.

5. The polymer blend as claimed in claim 1, wherein polyarylene sulfoxide is used as the polymer containing sulfoxide groups.

6. The polymer blend as claimed in claim 2, wherein polyarylene sulfoxide is used as the polymer containing sulfoxide groups.

7. The polymer blend as claimed in claim 1, wherein polyphenylene sulfoxide is used as the polymer containing sulfoxide groups.

8. The polymer blend as claimed in claim 2, wherein polyphenylene sulfoxide is used as the polymer containing sulfoxide groups.

9. The polymer blend as claimed in claim 1, wherein the polymer containing sulfoxide groups which is used has a sulfoxide group content of at least 10%, based on all sulfur atoms present.

10. The polymer blend as claimed in claim 2, wherein the polymer containing sulfoxide groups which is used has a sulfoxide group content of at least 10%, based on all sulfur atoms present.

11. The polymer blend as claimed in claim 1, wherein the polymer containing sulfoxide groups which is used has a sulfoxide group content of at least 65%, based on all sulfur atoms present.

12. The polymer blend as claimed in claim 2, wherein the polymer containing sulfoxide groups which is used has a sulfoxide group content of at least 65%, based on all sulfur atoms present.

13. The polymer blend as claimed in claim 2, wherein from 1 to 99% by weight of polymer containing sulfoxide groups and from 1 to 99% by weight of the high-performance polymer are present, the percentages by weight being based on the total polymer content of the polymer blend and the sum of the amounts by weight of polymer containing sulfoxide groups and high-performance polymer being 100% by weight.

14. The polymer blend as claimed in claim 2, wherein the ratio of storage modulus to loss modulus of the polymer blend is increased by more than 10 percent compared with the value of the pure high-performance polymer which is also contained in the polymer blend.

15. A process for the preparation of polymer blends as claimed in claim 1, a mixture of at least one high-performance polymer and at least one polymer containing sulfoxide groups being heated in the range of from 150 to 400° C.

16. A method of producing a shaped article comprising the step of molding a polymer blend as defined in claim 1 into a shaped article selected from the group consisting of fibers, films and moldings.

17. A method of producing a shaped article comprising the step of molding a polymer blend as defined in claim 2 into a shaped article selected from the group consisting of fibers, films and moldings.

18. A process as in claim 15 including the step of producing a shaped article from the polymer blend.

* * * * *